United States Patent [19]

Schreier

[11] 4,304,162

[45] Dec. 8, 1981

[54] ELECTRONIC MUSICAL INSTRUMENT INCLUDING IMPROVED VIBRATO

[75] Inventor: Wilford R. Schreier, Bensenville, Ill.

[73] Assignee: Marmon Company, Chicago, Ill.

[21] Appl. No.: 163,083

[22] Filed: Jun. 26, 1980

[51] Int. Cl.[3] .............................. G01H 1/043

[52] U.S. Cl. .............................. 84/1.25; 84/DIG. 4; 84/DIG. 26; 179/1 J; 333/138

[58] Field of Search .............................. 84/1.24, 1.25, DIG. 4, 84/DIG. 26; 179/1 J; 331/106, 178; 333/138, 165

[56] References Cited

U.S. PATENT DOCUMENTS

| | | | |
|---|---|---|---|
| 3,749,837 | 7/1973 | Doughty | 179/1 J |
| 3,833,752 | 9/1974 | Van Der Kooij | 84/1.24 |
| 3,835,237 | 9/1974 | Adachi | 84/1.24 |
| 3,866,505 | 2/1975 | Adachi | 84/1.24 |
| 3,878,472 | 4/1975 | Osakabe | 84/1.25 X |
| 3,881,057 | 4/1975 | Adachi et al. | 179/1 J |
| 3,945,290 | 3/1976 | Dittmar | 84/1.25 |
| 4,000,676 | 1/1977 | Love | 84/1.25 |
| 4,072,079 | 2/1978 | Sharp | 84/1.24 |
| 4,080,861 | 3/1978 | Wholahan | 84/1.24 |
| 4,186,643 | 2/1980 | Nishibe et al. | 84/1.24 |

*Primary Examiner*—S. J. Witkowski

*Attorney, Agent, or Firm*—Neuman, Williams, Anderson & Olson

[57] ABSTRACT

In an electronic organ including at least two frequency controlled delay circuits controlled by varying frequency output signals from individual voltage controlled oscillators, an analog modulating and intermixing circuit provides an even vibrato effect by controlling the input signal to the voltage controlled oscillators. The amplitude of a vibrato signal which is mixed with a main voltage control signal for a voltage controlled oscillator to provide a vibrato effect is modulated by the primary voltage control signal. The primary voltage control signal is amplified and passed to the control input of a voltage controlled amplifier which receives the vibrato signal. The amplified primary voltage control signal is mixed with the output of the voltage controlled amplifier to generate the control signals for driving the voltage controlled oscillators. In this way, the magnitude of the vibrato signal mixed with the primary voltage control signal is proportional to the amplitude of the primary voltage control signal such that its effect on the voltage controlled oscillator is uniform throughout the magnitude ranges of the primary voltage control signal.

6 Claims, 1 Drawing Figure

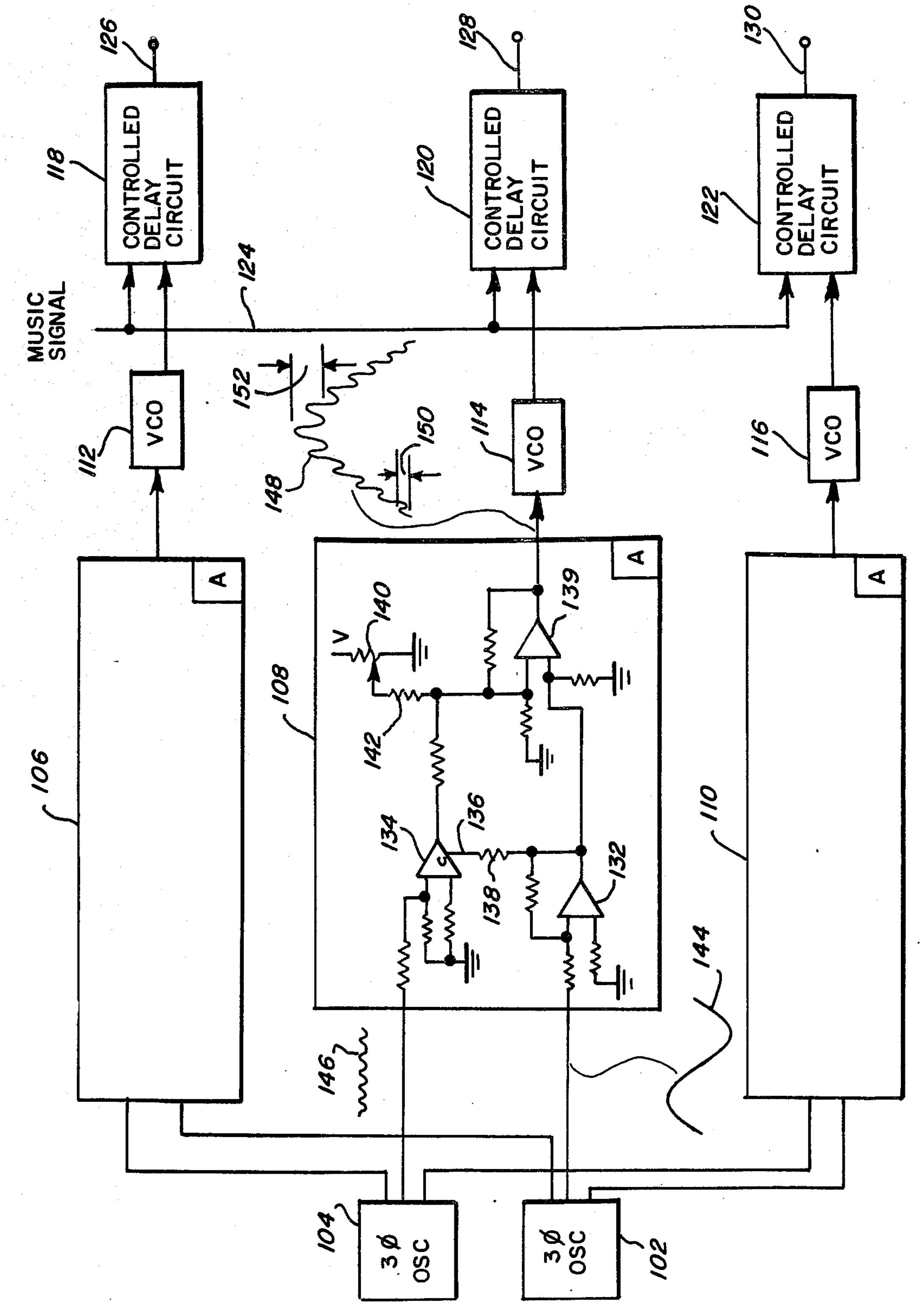
126
128
130
118
CONTROLLED DELAY CIRCUIT
120
CONTROLLED DELAY CIRCUIT
122
CONTROLLED DELAY CIRCUIT
MUSIC SIGNAL
124
152
150
148
112
VCO
114
VCO
116
VCO
106
A
108
A
110
A
V
140
139
142
134
136
138
132
144
146
104
3Ø OSC
102
3Ø OSC

ELECTRONIC MUSICAL INSTRUMENT INCLUDING IMPROVED VIBRATO

BACKGROUND OF THE INVENTION

This invention relates to electronic musical instruments generally and more particularly, to an improved vibrato system for electronic organs.

In pipe organ practice, an enhanced animation or a brightening effect for notes played on the organ is produced by playing two or more closely tuned tones together. For example, one set of pipes can be accurately tuned while a second set of pipes is tuned slightly sharp or slightly flat. This enhanced effect may also be produced by sounding together sets of pipes which are purposely tuned slightly flat and slightly sharp so that the true frequency of the note represented by the key played by the organist is between the frequencies of the two sets of pipes. This effect has a slow "beating" associated with it which depends on the frequency spread between the tones being played.

Electrical signals generated to simulate pipe organs can be similarly enhanced by combining both a slightly flat signal and a slightly sharp signal. Various techniques are available to simulate such enhancement without actually generating all the different frequency signals which would otherwise be required. For example, music signals can be passed through a delay line and various output taps along the line can be scanned in both a forward direction and a backward direction through the delay line to create the flat tones and the sharp tones respectively. It is also possible to generate an enhanced output signal using a controlled delay circuit. By modulating a control or clock signal which controls the amount of delay of the circuit, the delay can be slowly increased to generate a slightly flat signal and the delay can be slowly decreased to generate a slightly sharp signal. For this arrangement, two channels are provided with control signals which increase the delay on one channel and decrease the delay on the other channel. The two control signals repeatedly reverse such that one channel is always generating a flat signal while the other channel is always generating a sharp signal. By combining the output signals of the two channels, an enhanced output signal is generated.

One well-known electronic delay circuit commonly referred to as a "bucket brigade" circuit passes sampled input signals along a chain of capacitors via intermediate electronic switch circuits. The amount of delay through the delay circuit is controlled by the frequency of the cotrol or clock signal applied to the electronic switch circuits. If two such delay circuits are driven by two separate clock signals one of which is increasing in frequency while the other is decreasing in frequency, then the output signal of the one delay circuit is slightly sharp while the output signal of the other is slightly flat. The direction of frequency change of the two clock signals is repeatedly reversed such that each signal alternately increases and decreases in frequency and the direction of frequency change is always opposite for the two clock signals, i.e., one clock frequency is increasing while the other clock frequency is decreasing. By combining the output signals from the to channels an enhanced signal is generated.

Vibrato is a pulsating effect produced by periodic alternation of the pitch of a given tone at a rate of approximately six times per second. Illustrations of vibrato are the slight oscillation of a finger on a violin string or the slight wavering of a tone in singing.

A vibrato effect can be imposed upon the output signal from the "bucket brigade" delay circuits by frequency modulating the two control signals controlling the delay of the circuits with a vibrato signal. The increase and decrease in the frequency of the control signals is thus staggered by the vibrato signal such that a warble effect or vibrato is introduced into the output signal.

A control signal for a "bucket brigade" delay circuit can be generated by a voltage controlled oscillator (VCO). If a VCO is driven by a voltage signal which alternates between maximum and minimum amplitudes at a low frequency of approximately one cycle per second or one cycle per several seconds, an output signal which repetitively increases and decreases in frequency is generated. If the voltage signal is mixed with a lower amplitude vibrato signal which varies at a rate of approximately six or seven cycles per second and the mixed signal is used to drive the VCO, the increase and decrease in the frequency of the VCO output signal will not be smooth but will vary at the rate of the vibrato signal. Such a varying frequency signal when used to drive the "bucket brigade" delay circuits as previously described will generate a vibrato effect in a music signal which is passed through the delay circuits.

A difficulty arises in mixing the primary voltage signal to a voltage controlled oscillator with the lower amplitude vibrato signal. When a constant amplitude vibrato signal is mixed with the primary voltage signal, the vibrato effect is accentuated at the low voltage levels of the primary voltage signal and practically nonexistent at the high voltage levels. This is because the small amplitude vibrato signal is large relative to the amplitude of the primary voltage signal at the low levels but at the high levels of the primary voltage signal, the amplitude of the vibrato signal is so small relative to the amplitude of the primary voltage signal as to be insignificant.

SUMMARY OF THE INVENTION

In accordance with the present invention, an analog circuit is provided to change the amplitude of the vibrato modulating signal in proportion to the amplitude of the primary voltage control signal prior to mixing the two signals together to generate an input signal for a VCO. When the output signal of the VCO is used to control a delay circuit, the vibrato effect on the output signal from the delay circuit is evenly provided throughout the entire voltage range of the primary voltage control signal.

In an electronic organ having means for generating music signals, an improved vibrato system comprises first oscillator means for generating at least two sequences of repetitive signals of a first frequency which are related to one another by defined electrical phases and second oscillator means for generating at least two sequences of repetitive signals of a second frequency greater than the first frequency but related to one another by the same electrical phases. At least two control means, each control means receiving one phase of the signals from the first oscillator means and one phase of the signals from the second oscillator means and amplifying and intermixing those signals to generate a voltage output signal. Each of the control means comprises voltage controlled amplifier means for variably amplifying the signals received from the second oscillator means to generate an output signal, circuit means for amplifying the signals from the first oscillator means to generate an output signal which controls the voltage controlled amplifier means, and mixer means for combining the output signal of the circuit means and the output signal of the voltage controlled amplifier means to generate a voltage output signal. At least two voltage controlled oscillator means for generating repetitively varying frequency signals in response to the voltage output signal of one of the control means. The repetitively varying frequency signals of the voltage controlled oscillator means individually drive at least two frequency controlled delay means which receive the music signals and generate music output signals which are delayed in accordance with the repetitively varying frequency signals received from the two voltage controlled oscillator means.

In accordance with one illustrative embodiment of the present invention, two oscillator circuits each generate three sequences of repetitive signals separated from one another by 120° of electrical phase. Three control means each of which receive one of the phase signals from the first oscillator circuit and one of the phase signals from the second oscillator circuit and amplify and intermix those signals to generate voltage output signals. The voltage output signals control three corresponding voltage controlled oscillators which generate varying frequency output signals to individually control three frequency controlled delay circuits. The music input signals are variably delayed by the delay circuit to generate three channels of output music signals which overlappingly oscillate between sharp and flat variations of the input music signals.

Each of the control means includes means for controlling the DC output level of the modulated voltage output signal.

BRIEF DESCRIPTION OF THE DRAWING

For a more complete understanding of this invention, reference should now be made to the embodiment illustrated in greater detail in the accompanying drawing and described below by way of example of the invention. The drawing is a block diagram of an enhanced vibrato system in accordance with the present invention.

It should be understood that the invention is not limited to the particular embodiment illustrated herein.

DETAILED DESCRIPTION OF THE ILLUSTRATIVE EMBODIMENT

Generally disclosed in the drawing is a block diagram of an improved vibrato system for an electronic organ. The oscillator circuits 102 and 104 each generate three phases of a sinusoidal wave form with the first phases of both oscillators going to the control circuit 106, the second phases of both oscillators going to the control circuit 108 and the third phases of both oscillators going to the control circuit 110. The three phases of signals generated by each oscillator circuits 102 and 104 are separated from one another by approximately 120° of electrical phase. It is noted that there is no synchronization or interrelation between the first and second oscillators. Although the same numbered phase signals from both oscillators are shown as driving the same control circuit, this is not necessary. In fact, only a single phase signal is required from the oscillator 104 to drive all control circuits; however, it is preferred to generate three phases of the signal from the oscillator 104 with a different phase provided to each control circuit. The control circuits are identical to one another and will be described in detail hereinafter with reference to the control circuit 108.

Sinusoidal output signals from the oscillators 102 and 104 are combined by the control circuits 106, 108 and 110 to form voltage signals which respectively drive the voltage controlled oscillators 112, 114 and 116. The frequency of the output signal of each voltage controlled oscillator increases as the voltage level of the input signal increases. Since the output of the oscillator 104 is modulated by the output of the oscillator 102 in each of the control circuits 106, 108 and 110, there is a varying amplitude ripple in the voltage signals controlling the voltage controlled oscillators 112, 114 and 116. The varying amplitude ripple in the control signals for the voltage controlled oscillators 112, 114 and 116 leads to a frequency change in the output signals from the voltage controlled oscillators 112, 114 and 116 which equalizes the vibrato effect throughout the voltage range of the output of the oscillator 102.

The output signals from the voltage controlled oscillators 112, 114 and 116 respectively drive the frequency controlled delay circuits 118, 120 and 122. A music signal generated by standard electrical circuitry well known in the art of electronic organs is provded to the input of the controlled delay circuits 118, 120 and 122 on the conductor 124.

The controlled delay circuits 118, 120 and 122 generate delayed music output signals on their respective output terminal 126, 128 and 130. The music signals are delayed in accordance with the frequency signals generated by the voltage controlled oscillators 112, 114 and 116 to generate three overlapping music output signals which, when combined, form an enhanced music signal including a vibrato effect.

If the signal from the oscillator circuit 104 is zero, the music output signals of the controlled delay circuits 118, 120 and 122 alternate sinusoidally between slightly sharp and slightly flat versions of the music signals present on the conductor 124. The output music signals are sharp while the sinusoidal wave form controlling the corresponding voltage controlled oscillator is increasing in magnitude with the amount of "sharpness" being proportional to the slope of the control signal. Similarly the output music signals are flat while the sinusoidal wave form controlling the corresponding voltage controlled oscillator is decreasing in magnitude with the amount of "flatness" being proportional to the slope of the control signal. The output music signals on the conductors 126, 128 and 130 have varying amounts of sharpness and/or flatness which overlap in accordance with the 120° phase relationship between the control signals driving the voltage controlled oscillators 112, 114 and 116. The output signals on the conductors 126, 128 and 130, can be combined electrically or acoustically to create an intermingling of variously delayed musical output signals to simulate the animation effect accomplished in a pipe organ by appropriately tuning or detuning sets of pipes and playing those sets of pipes together. If the output signals from the oscillator 104 are not zero, a vibrato effect is imposed on the output music signals.

In the prior art a fixed amplitude vibrato signal, e.g., the output signal from the oscillator 104, is directly mixed with a primary voltage control signal, e.g., the output signal from the oscillator 102. The vibrato effect is much more noticeable at the lower voltage levels of the primary voltage control signal than at the higher voltage levels of that signal. At the lower voltage levels of the primary control signal, the fixed amplitude of the vibrato signal from the oscillator 104 is of a sufficient magnitude to effect the voltage controlled oscillator to produce a vibrato effect in the output signal. However, when the primary control signal is at the higher voltage levels, the magnitude of the vibrato signal is so small relative to the magnitude of the primary control signal that it has little or no effect on the voltage controlled oscillator and hence produces little or no vibrato effect.

In accordance with the present invention, the control circuits 106, 108 and 110 vary the amplitude of the vibrato signal which is mixed with the primary voltage control signal. The magnitude of the vibrato signal is controlled by the primary voltage control signal to correlate the magnitudes of the two signals.

Since all the control circuits 106, 108 and 110 are identical, only the control circuit 108 will be described. The primary voltage control signal 144 from the oscillator 102 is amplified by the operational amplifier 132 and the associated resistor network surrounding that operational amplifier in accordance with well known analog circuit theory. The output 146 from the oscillator 104 is passed to a voltage controlled amplifier 134 whose amplification factor is controlled by the voltage level of the input on the control terminal 136. The output of the operational amplifier 132 is connected to the control terminal 136 via the resistor 138 to effectively control the amplitude of the vibrato signal which is mixed with the primary voltage control signal via the operational amplifier 139. The amplifier 139 and its associated resistors are connected as a mixer or adder circuit in accordance with well known analog circuit theory. The effect of the voltage controlled amplifier 134 is clearly shown in the output signal 148 by the changed amplitude of the vibrato modulating signal which is a smaller amplitude 150 when the primary control signal is at a low voltage level and a larger amplitude 152 when the primary control signal is at a high voltage level.

The variable resistor 140 connected between battery potential V and ground potential together with the resistor 142 provide a direct current (DC) voltage shift in the output signal of the operational amplifier 139.

In accordance with the above teachings, it will be apparent that an improved vibrato system has been described for use in an electronic musical instrument. The improved vibrato system overcomes the problems of the prior art in a simple and inexpensive manner to provide an even vibrato effect. A voltage controlled amplifier varies the amplitude of a vibrato signal in proportion to a primary voltage control signal before the two are mixed to control a voltage controlled oscillator which in turn controls a frequency controlled delay circuit through which music signals are passed. In accordance with the above teachings, alternate embodiments and modifications will be apparent to those of ordinary skill in the art. Such alternate embodiments and modifications are considered to be equivalents and included within the true spirit and scope of the invention as claimed in the following claims.

What is claimed is:

1. In an electronic organ having means for generating music signals, an improved vibrato system comprising:

first oscillator means for generating at least two sequences of repetitive signals, said signal being of a first frequency, provided on separate outputs and being related to one another by defined electrical phase relations;

second oscillator means for generating a sequence of repetitive signals, said signals being of a second frequency which is greater than said first frequency;

at least two control means for amplifying and intermixing said repetitive signals from said first oscillator means and said repetitive signals from said second oscillator means to generate voltage output signals, each of said control means receiving individual phases of said repetitive signals from said first oscillator means and comprising:

voltage controlled amplifier means having first and second inputs and an output for generating a modulated output signal on its output by amplifying said repetitive signals received from said second oscillator means on said first input by a varying amount of amplification in response to a modulating signal received on said second input;

circuit means having an input and an output for generating an amplified output signal on its output in response to said repetitive signals received from said first oscillator means on said input, said amplified output signal controlling said voltage controlled amplifier means via the second input of said voltage controlled amplifier means; and mixer means connected to the outputs of said voltage controlled amplifier means and said circuit means for combining said modulated output signal and said amplified output signal to generate said voltage output signal;

at least two voltage controlled oscillator means for generating repetitively varying frequency signals in response to the voltage output signal of one of said control means; and at least two frequency controlled delay means for receiving said music signals and generating music output signals which are delayed by varying amounts in response to said repetitively varying frequency signals from one of said voltage controlled oscillator means.

2. The improved vibrato system of claim 1 wherein each of said control means further comprises means connected to said mixer means for controlling the direct current voltage level of said voltage output signal.

3. The improved vibrato system of claim 1 wherein said mixer means and said circuit means each comprise an operational amplifier.

4. The improved vibrato system of claim 3 wherein said voltage controlled amplifier means comprises a voltage controlled operational amplifier.

5. The improved vibrato system of claim 1 wherein said second oscillator means generates at least two of sequences of repetitive signals which are provided on separate outputs and are related to one another by defined electrical phase relations and said control means each receive different phase signals from said second oscillator means.

6. The improved vibrato system of claim 5 wherein said first and second oscillator means each generate three sequences of repetitive signals electrically phased from one another by 120 degrees and said system comprises three control means, three voltage controlled oscillator means and three frequency controlled delay means.

* * * * *